Figure 1:
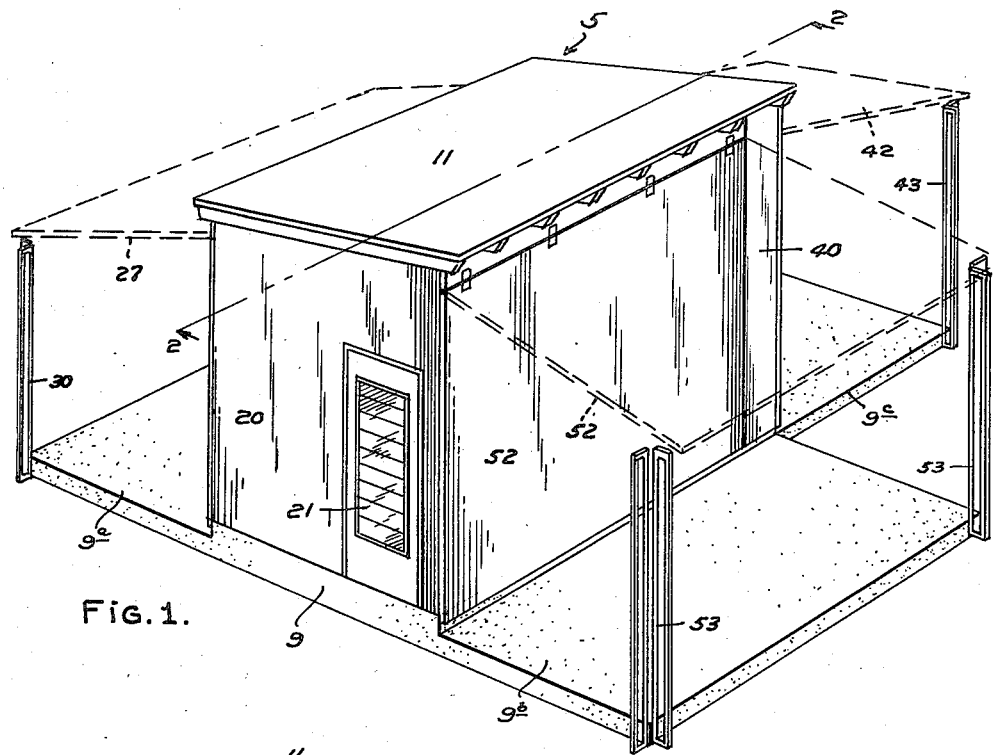

Feb. 12, 1957  W. N. DE SHERBININ  2,780,843
EXPANSIBLE BUILDING ENCLOSURE
Filed Nov. 18, 1954  5 Sheets-Sheet 1

INVENTOR.
WILLIAM N. DE SHERBININ
BY
ATTORNEY

Feb. 12, 1957 W. N. DE SHERBININ 2,780,843
EXPANSIBLE BUILDING ENCLOSURE
Filed Nov. 18, 1954

INVENTOR.
WILLIAM N. DE SHERBININ,
BY
ATTORNEY

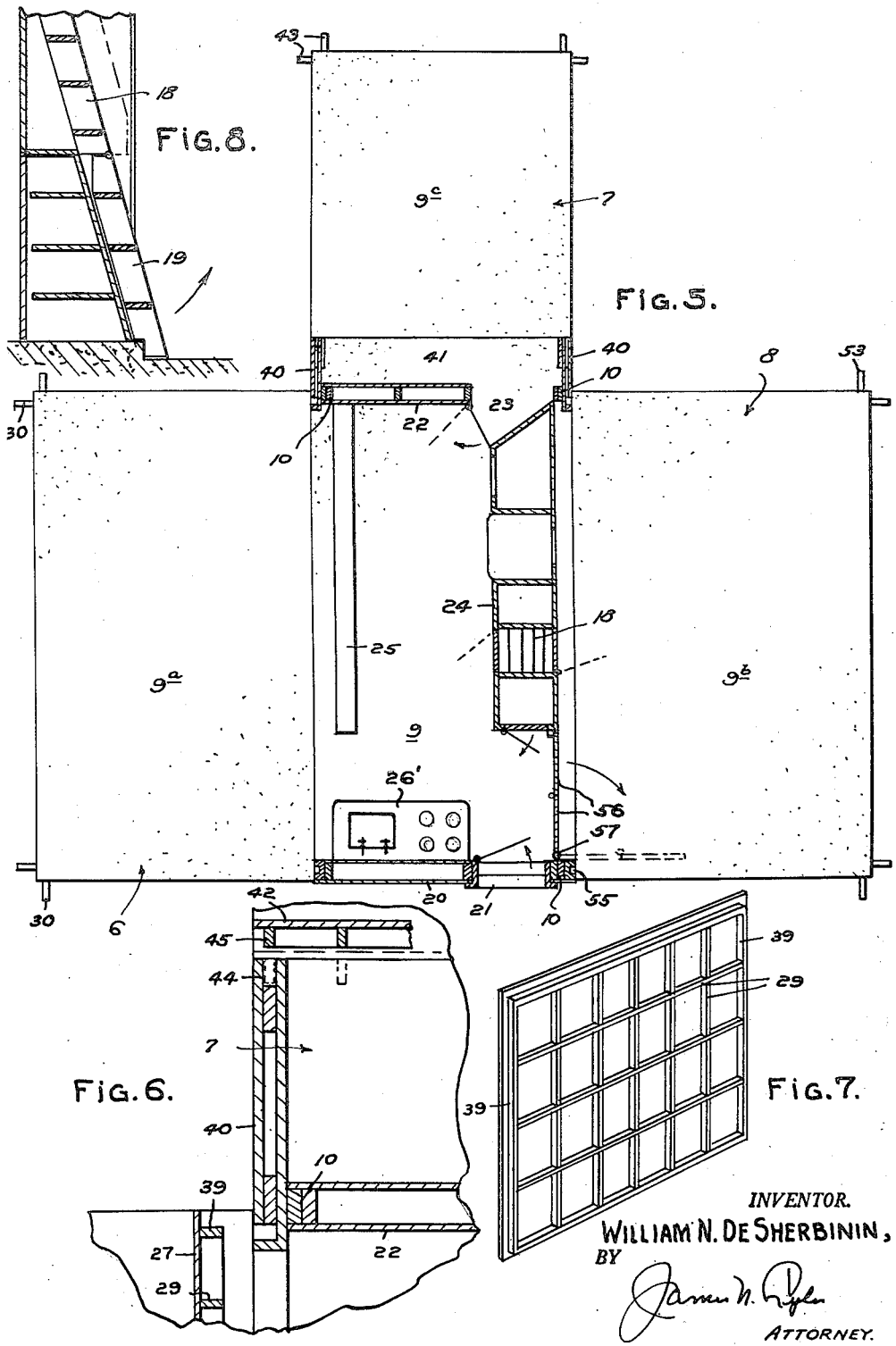

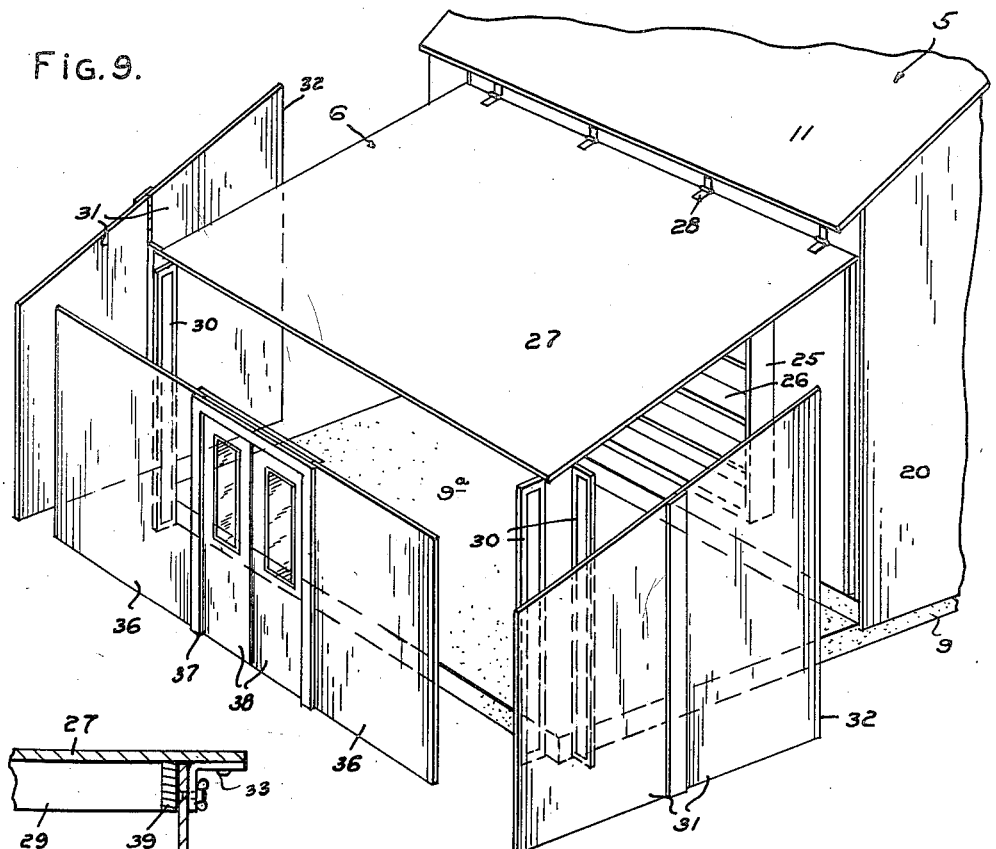
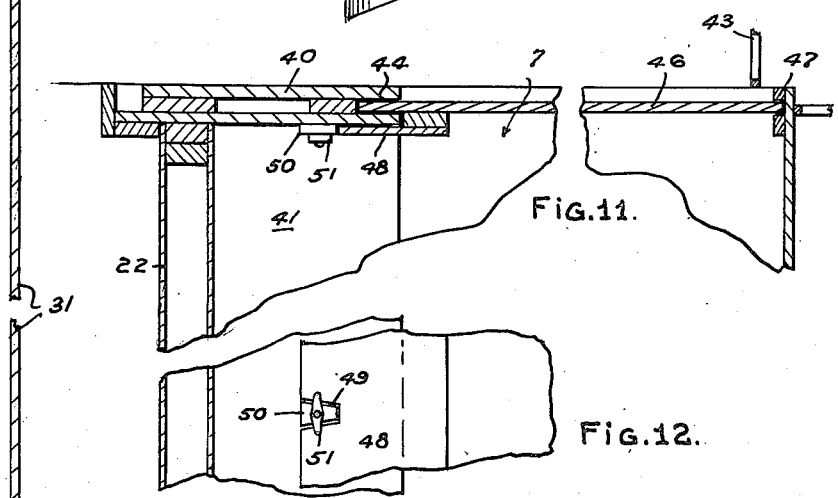
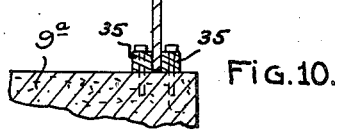

United States Patent Office 2,780,843
Patented Feb. 12, 1957

2,780,843

EXPANSIBLE BUILDING ENCLOSURE

William N. de Sherbinin, Fort Lauderdale, Fla.

Application November 18, 1954, Serial No. 469,649

1 Claim. (Cl. 20—1)

This invention relates broadly to building constructions and has particular reference to a collapsible form of building primarily for residential purposes and with the building being of such construction as to be extensible in a novel manner to quickly and easily increase the room area.

The invention has for its object a building having a permanently constructed section and with the building provided with side walls of panel type that may be subsequently elevated outwardly and upwardly to form extended roof portions for additional room areas and with the additional room areas being subsequently enclosed by swinging or removable wall panels that are connected with the roof sections and permanent and preferably concrete slab sections to form fully enclosed rooms having the characteristics of a permanently constructed building of corresponding room area.

A further object of the invention resides in novel living and housekeeping equipment contained within the permanently constructed portion of the building and with the permanently constructed portion being constructed and arranged to receive and store the wall forming panels of the extended room areas.

A further object of the invention resides in a novel form of room attachment that readily adapts itself as a room extension for other and non-collapsible types of buildings.

Novel features of construction and arrangement of parts will be readily apparent during the course of the following description, reference being had to the accompanying drawings, wherein has been illustrated a preferred form of the device and wherein like characters of reference are employed to denote like parts throughout the several figures.

In the drawings:

Figure 1 is a perspective view of a building constructed in accordance with the invention and shown in the collapsed or single unit arrangement.

Figure 2:
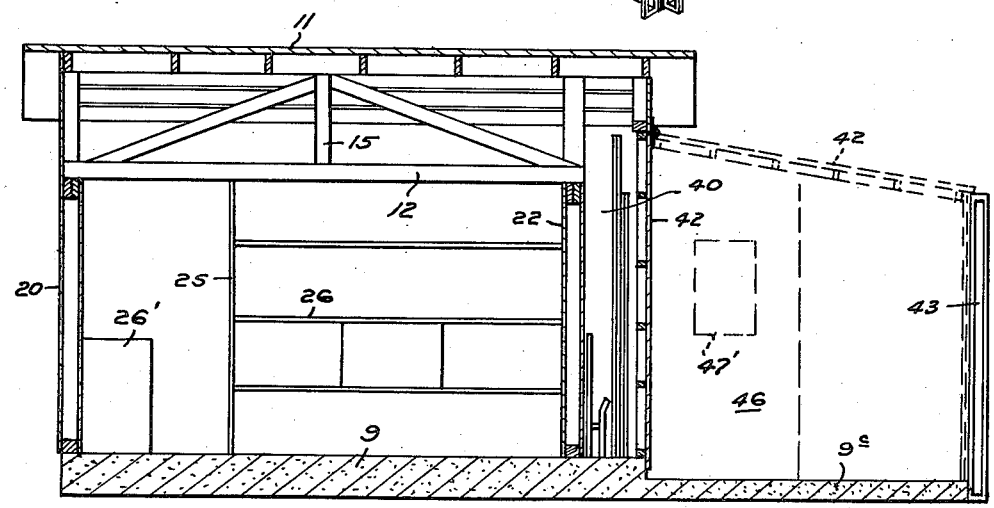
Figure 3:
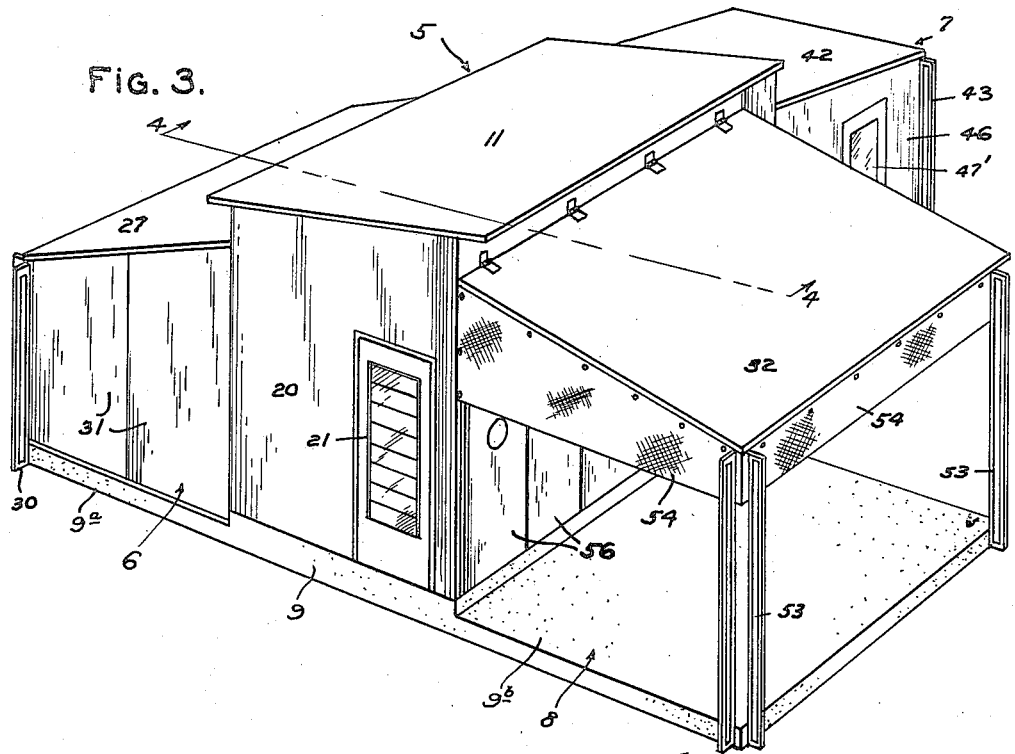
Figure 4:
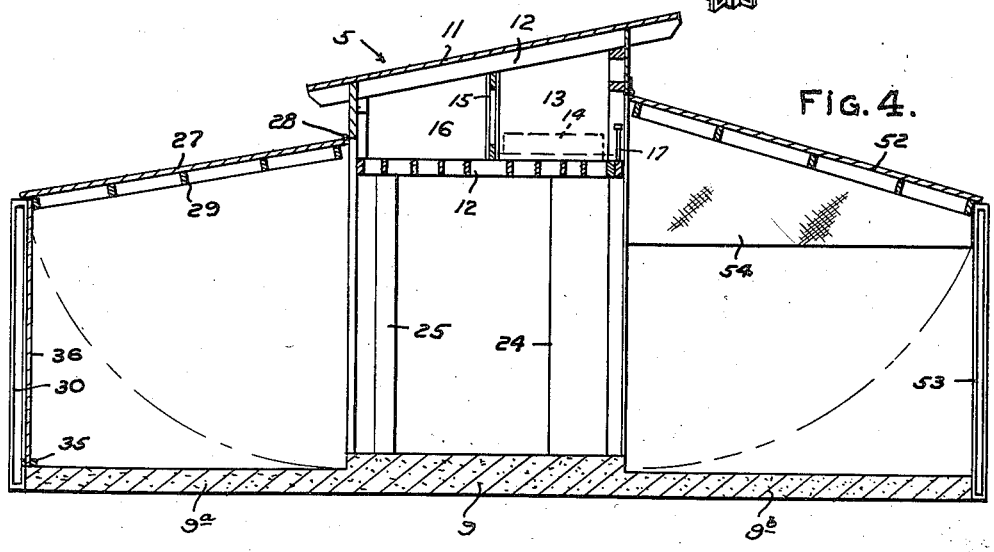
Figure 13:
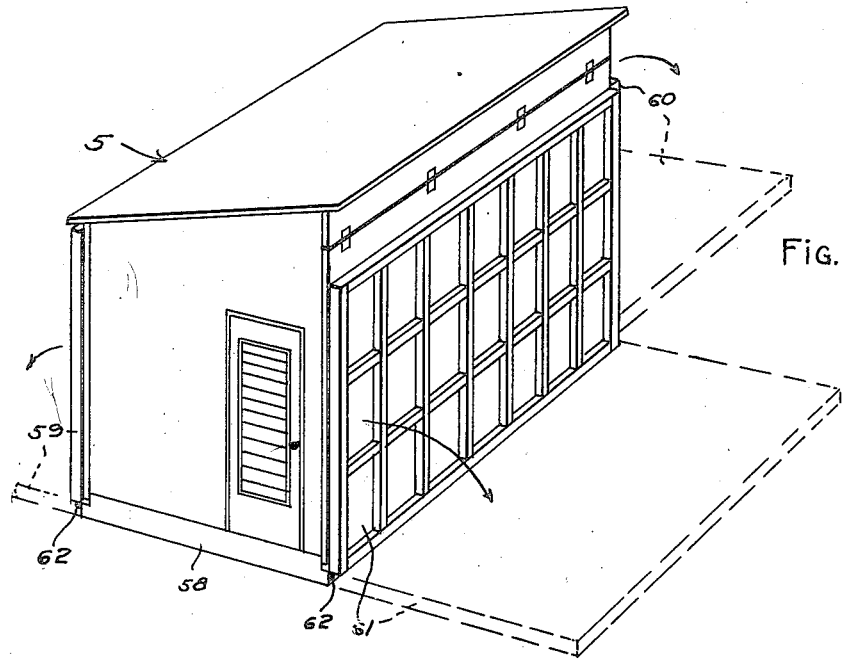

Figure 2 is a longitudinal vertical section taken substantially on line 2—2 of Figure 1, Figure 3 is a perspective view of the device with the wall panels shifted to room-forming position for additional room areas and with the room areas being enclosed by side wall panels, Figure 4 is a section taken substantially on line 4—4 of Figure 3, Figure 5 is a horizontal section, parts being omitted for sake of clearness, Figure 6 is an enlarged fragmentary horizontal section illustrating the recessing and weathering engagement of the room-forming panels with respect to the fixed structure of the building, Figure 7 is a perspective view illustrating a preferred form of room-forming panel, Figure 8 is a detail section illustrating a foldable ladder for access to an elevated sleeping compartment of the permanent section of the building, Figure 9 is a fragmentary perspective view of one room extension and its associated enclosing wall-forming panels, Figure 10 is a fragmentary vertical section illustrating the manner of positioning the wall-forming panels of the room extension shown in Figure 9, Figure 11 is a fragmentary horizontal section illustrating an interlocking wall-forming panel for one room extension, Figure 12 is a detail side elevation of a latch means employed to support the panel (Figure 11) against displacement, Figure 13 is a perspective view illustrating a modified form of floor extensions.

Referring specifically to the drawings, the numeral 5 indicates as a whole a permanently constructed housing section, the numeral 6 designates as a whole one room extension, the numeral 7 designates a section room extension and the numeral 8 designates a preferably enclosed porch extension. The several units are adapted to be supported upon and to be co-extensive with a permanent and preferably concrete floor 8. As clearly illustrated, the floor areas $9^a$, $9^b$, and $9^c$ are at a pre-determined lower level than the floor for the permanent unit 5.

As illustrated, the permanent unit 5 is constructed in various manners generally recognized in the construction industry and embodies corner posts 10 that support a roof 11 of any well known and desirable construction. The corner posts 10 are anchored to the floor 9 in any well recognized manner. As here illustrated, the unit 5 is of generally rectangular form, although it will be apparent that the invention is in no sense restricted to the dimensions. The unit 5 has a height that permits the installaion of preferably finished ceiling rafters 12 providing an area 13 for the major length of the unit wherein is positioned sleeping units, such as mattresses indicated in dotted line at 14. The upper area above the rafters 12 is preferably divided by a truss structure 15 for additional rigid support of the roof 11 and forms with the area 13 a storage area 16, wherein may be stored baggage and the like. The sleeping area 13 may be ornamented in any desirable manner and an ornamental rail 17 may be employed as a guard against accidental rolling therefrom of an occupant. Access to the sleeping area 13 is provided by a swinging two-part ladder 18, the lower section 19 of which is foldable upwardly as shown in dotted lines in Figure 8 to permit the fully closed position of a combined wall and room-forming panel to be presently described. The unit 5 is permanently closed at one end by panel 20 provided with a conventional closure door 21 through the medium of which access may be had to the unit 5 when in the collapsed position. The unit 5 is further provided with a partition 22 at its opposite end having a door opening 23 for access to the room extension 7. The interior of the unit 5 is further provided with fixed partitions 24 forming storage cabinets, a dressing table and such other equipment commonly employed in a housing unit. The partition 25 extends longitudinally of the unit 5 from the partition 22 and the partition 25 is provided with ornamental shelving and the like 26. The partition 25 terminates at a point that permits access to the unit 6 when in the extended position. A combined cooking and refrigerating unit and sink 26' is disposed adjacent the lower panel 20. It will therefore be apparent that the unit 5 is substantially closed permanently at its opposite ends.

One open side of the unit 5 is normally closed by a vertical swinging panel 27 hinged as at 28 for its full length to the permanent unit 5. The panel 27 is constructed in any desirable manner, such as that illustrated in Figure 7 by a plurality of relatively light weight criss-cross strips 29. The strips 29 are generally recognized in aircraft construction and permit the use of a relatively light weight panel 27 capable of being bodily swung upwardly to form the roof for the extension 6. When swung upwardly, the opposite free corners of the panel 27 are engaged upon and connected to preferably wrought iron corner columns 30. Each end of the room extension 6 is closed by panels 31, preferably vertically hinged together and with a marginal edge 32 being either hinged to the corner of the unit 5 or separable for folding and storing within an area outwardly of the partition 25. The panels 31, while here shown as being separated in Figure 9 for purpose of illustration, may be connected and mounted in any desirable manner. The panels 31 when hinged to the unit 5 are swung outwardly when the roof panel 27 has been elevated and have abutting engagement with fixed angle irons 33 carried adjacent the marginal edges of the panel 27. Bolts and wing nuts may be employed to rigidly connect the panels 31 with the panel 27. The bottom ends of the panels 31 are held against shifting movement by preferably removable inner and outer stop strips 35, that have studs that engage within suitable sockets formed within the floor 9a. Panels 36 and a suitable door frame 37 carrying closure doors 38 are positioned beneath the forward edge of the panel 27 and are secured in like manner to the panels 31. The panels 36 and the frame and doors 38 are preferably formed in separate sections to be disposed as a closure wall for the forward side of the room area 6. The panels 36 and the door frame and doors obviously are disposed in that area between the partition 25 and the panel 27 when the panel 27 is shifted to the wall-forming position. As clearly shown in Figure 5, the unit 5 is preferably vertically slotted for the reception of the side strips 39 of the panel 27 and serves to effectively interlock and seal the side of the building against the entry of foreign matter when the panel is fully closed. The forward edge of the panel has abutting engagement with the step portion of the floor area in the closed wall-forming position.

The unit 7 embodies fixed wall extensions 40 that are connected upon the opposite sides of the unit 5 and the raised area of the floor 9 is substantially co-extensive with these extensions. The extensions 40 provide a novel structural means that may be applicable to presently constructed buildings and additionally serve to brace the unit 5 against any tendency to twist under wind pressures. The extensions 40 outwardly of the partition 22 provide an area that is rigid with the unit 5 and serves to provide a recess or alcove section at that end of the building wherein a conventional folding type of bed may be installed. The end of the alcove indicated at 41 is normally closed by a panel member 42, constructed in a manner similar to that illustrated in Figure 7. The panel 42 is hinged at its upper end to the unit 5 and is shiftable in a vertical plane for forming a roof member for the room area 7. The panel 42 when elevated has resting and connecting engagement with preferably wrought iron corner posts 43 and any suitable latch means may be employed to securely hold the panel in its roof-forming position against displacement from the post. The extensions 42 are provided with forward slots 44 into which engage side strips 45 carried by the panel 42 and serve to form an adequate weather seal against the entry of foreign matter when the device is in the collapsed or wall-forming position. The sides and end portion of the room area 7 are closed by removable panels 46, and with the end and side panels being interconnected at their meeting ends in any desirable manner as at 47. Similar stops 35 are employed to prevent lateral shifting of the panels at their lower ends, while the panels at their upper ends are connected with the roof-forming panel 42 in a manner similar to the panels 31. The panels 46 may be provided with suitable door and window openings 47'. The panels 46, see particularly Figures 11 and 12, engage within the slots 44 at assembly, and each side panel 46 is provided with an inwardly positioned and parallel section 48 that has its forward edge notched as at 49 to engage over fixed wedge shaped lugs 50 carried by the inner surface of the extensions 40. Latch devices 51 retain the members 48 in accurate position against accidental shifting. In the collapsed position of the room section 7, the panels 46 are disassembled and stored within the alcove 41 after which the panel 42 is lowered to close the open end. Obviously, the room-forming panels, when in the collapsed wall-forming position, are securely anchored in any desirable manner against accidental shifting or shifting by unauthorized persons.

The room area 8 embodies the combined side and roof-forming panel 52 that is hinged along its upper edge to the permanent structure 5 in a manner to permit the panel to be shifted in a vertical plane for subsequent resting and latching engagement upon preferably wrought iron corner posts 53. It is contemplated that the area 8 is to form an open porch or patio. Preferably canvas side wings 54 have detachable snapping engagement with the free edges of the panel 52 and with the structure 5, while the area between the canvas 54 and the floor 9b may be closed by any suitable frame insect screening. The building 5 has also been slotted at 55 for the weathering reception of strips carried by panel 52 along its opposite ends. The unit 5 is provided with a double foldable door unit 56 leading from the unit 5 to the area 8. The door 56 is hinged as at 57 to the fixed structure of the unit 5 and may be swung outwardly as indicated in dotted lines at Figure 5, and if desired folded upon itself. The structure of the panel 52 is substantially identical to that illustrated in Figure 7. It is contemplated that substantially all of the panels, including the fixed panels of the section 5 and the roof portion 11, shall be formed of light weight waterproof plywood, due to its relatively long life, the ease of handling and readily lends itself to ease of decoration.

In the use of the device, assuming the building to be fully closed as shown in Figure 1, when it becomes necessary to open or extend the building for forming additional room areas, the operator enters the doorway 21 and, should the several side panels be releasable from the inside, their particular latch means are released and the operator then proceeds to the exterior of the building and lifts either of the selected panels 27, 42 or 52 to a point where its corner portions engage and latch upon the upper ends of the wrought iron posts. Assuming that the panel 27 is first elevated, the operator then proceeds to swing the panels 31 outwardly to a point where they have abutting engagement with the angle irons 33. The stops 35 are then placed in position after which the panels 36, the door frame 37 and the doors 38 are installed in the manner hereinbefore described. The outer corners of the panels 36 and 31 are obviously interlocked in a manner to prevent the entry of foreign matter therebetween. The operator then proceeds to lift the panel 42 to a point of latching engagement with the upper ends of the corner posts 43 after which the panels 46 are removed from their storage position within the alcove 41 and installed upon the sides and end of the room area 7. The operator then proceeds to lift the panel 52 to a point where it has latching and resting engagement with the upper ends of the columns 53. The canvas panels 54 are then snapped into position and, if desired, suitable insect screen frames are positioned to close the sides and end of the room area 8. The closure doors 56 may then be freely swung to the open position for access to and from the unit 5. As before pointed out, the partition 25 is formed sufficiently short to provide a passageway from the unit 5 to the room area 6, while the door opening 23 provides access from the unit 5 to the room area 7. However, a doorway is preferably provided in one of the panels 46 for access to the room area 7 from the outside. The ladder 18, when in the folded position may be entirely covered by any suitable closure door.

It will be apparent from the foregoing that a very novel and highly flexible type of building has been provided. The fixed unit 5 embodies major rigid structural details common to a permanent structure, while the several side panels 27, 42 and 52 permit the building to be expanded in a very novel and economical manner and in a minimum of time, and the elevation of the panels 27, 42 and 52 and the setting of the several side panels 31, 36 and 46 may be accomplished by one person of average strength. Several panels all interfit in weathering engagement and the structure is such as to withstand a very considerable wind pressure and, due to their waterproof material, do not require an external covering for the panels 27, 42 and 52. When the occupant expects to leave the property for an extended period of time, the several panels 31, 36 and 46 and the canvas wings 54 are removed and stored within their respective recesses, after which the several panels 27, 42 and 52 are lowered and latched into fully covering position with the opposite sides and end of the building. The door 21 therefore provides the only access opening for the building when in the closed or collapsed position, and if adequately protected avoids to a large extent any unauthorized entry. Obviously, before the panel 52 is lowered, the section 19 of the ladder 18 must be folded upwardly as indicated in dotted lines. The structure is extremely compact and readily lends itself to various floor arrangements, utilizes substantially all of the available space, readily lends itself to production line manufacture in an economical manner, and provides in effect a relatively large building at a cost comparable to a single room structure. The use of the extensions 40, commonly referred to as blister rooms, are readily applicable to presently constructed buildings with a minimum of cost and effort. Toilet facilities, while not illustrated, will be an optional addition to the building and may be attached to the building in much the same manner as the blister room. The area beneath the eaves of the roof 11 may also be ventilated throughout in any desirable manner. When the building is completely closed in, as when the roof forming panels 27, 42 and 52 have been shifted to wall forming position, the only exposed part of the plan would be the floor areas 9, 9a, 9b and 9c, and the wrought iron supporting columns, all other parts of the structure being fully housed and protected against the elements. The principles involved in the invention are adaptable to various designs and dimensions of buildings.

Referring now to Figure 13, the building 5, forming the permanent structure, is substantially identical to that already described. The building embodies the same roof-forming panels 27, 42 and 52, here shown as being in the closed position with the room extension wall-forming panels being housed as before. A floor section 58, corresponding to the floor 9, is now preferably formed of wood framing in a manner conventional to frame buildings. The purpose in forming the floor section 58 of wood is to reduce the overall weight of the building in cases where the building shall be adapted for transport and in many cases installed as a temporary housing unit, such as military establishments, etc. Since the building is to embody the same or substantially the same room extensions, it becomes necessary that floor sections be provided for such extensions. For this purpose, there has been fabricated floor extensions 59, 60 and 61, being substantially co-extensive in area to the floors 9a, 9b and 9c. The several floor extensions 59, 60 and 61 are hinged as at 62 to the permanent unit 5 and swing in a vertical plane to be secured in an upper parallel position with respect to the sides of the unit 5, where they are securely latched against shifting. The floor extensions 59, 60 and 61 are shiftable downwardly to a horizontal position, as shown in dotted lines after the unit 5 has been securely anchored. Thus, the unit 5 may be readily collapsed, including the floor extensions and conveniently shipped to a desired point of use.

It is to be understood, that while but one example of the structure has been illustrated and described, numerous changes are contemplated as readily fall within the spirit of the invention, as determined by the scope of the subjoined claims.

Having described my invention, what I claim as new and desire to secure by Letters Patent is:

A building structure of the character described that comprises a fixed concrete base of rectangular form and with the base being extended upon two longitudinal sides and upon one end to form floor extensions with the base, the floor extensions being at a lower level than the base, a rigid permanent housing fixed upon the base and extending for substantially the entire area thereof, the housing embodying fixed corner posts, a roof cover and with one end of the housing being permanently closed by a wall panel, the said panel being provided with a door and door opening, the said housing being open upon two sides and one end, partition members disposed within the housing inwardly from one open side and the open end whereby to form recesses, panel members for closing the open sides and the open end, the said last named panels being hingedly connected at their upper marginal edges to the fixed housing whereby the panels are shiftable in a vertical plane to project outwardly away from the fixed housing to form roof members that overlie the floor extensions, the several hingedly connected panels when in a position to cover the open sides of the housing adapted to have a weather type engagement with the corner posts and with the said base, columns fixedly positioned at the outer corners of each of the floor extensions whereby to form supports for the shiftable panels when they are moved to roof forming position, a plurality of collapsible wall forming panels that are positioned upon one floor extension and the end extension and whereby to underlie the roof forming panels to form a closure wall for room extensions, the said collapsible panels being collapsible for storage within the recesses formed by the inwardly positioned partitions whereby to house the said collapsible panels when the roof forming panels are shifted to overlying relation to the open sides and end of the fixed housing and means for rigidly connecting the collapsible panels with the roof forming panels and the floor extensions.

References Cited in the file of this patent

UNITED STATES PATENTS

| 131,114 | O'Brien | Sept. 3, 1872 |
| 1,258,788 | Koch | Mar. 12, 1918 |
| 1,474,462 | Blankenhagen | Nov. 20, 1923 |
| 1,498,173 | Kelley | June 17, 1924 |
| 1,661,482 | Kuhne | Mar. 6, 1928 |
| 1,724,577 | Gritzner | Aug. 13, 1929 |
| 2,052,757 | Fitch | Sept. 1, 1936 |
| 2,122,791 | Bollstrom | July 5, 1938 |

FOREIGN PATENTS

| 828,477 | France | Feb. 14, 1938 |
| 145,476 | Australia | Feb. 28, 1952 |

OTHER REFERENCES

Architectural Record, May 1950, pp. 152 and 156.